US011023444B2

(12) United States Patent
Bradshaw et al.

(10) Patent No.: US 11,023,444 B2
(45) Date of Patent: Jun. 1, 2021

(54) SERVICE DISCOVERY USING ATTRIBUTE MATCHING

(71) Applicant: Home Box Office, Inc., New York, NY (US)

(72) Inventors: Dexter Paul Bradshaw, Bainbridge Island, WA (US); Jeffrey Stamerjohn, Mercer Island, WA (US); Jinjiang Zeng, Mercer Island, WA (US)

(73) Assignee: HOME BOX OFFICE, INC., New York, NY (US)

( * ) Notice: Subject to any disclaimer, the term of this patent is extended or adjusted under 35 U.S.C. 154(b) by 87 days.

(21) Appl. No.: 15/435,979

(22) Filed: Feb. 17, 2017

(65) Prior Publication Data
US 2018/0239793 A1    Aug. 23, 2018

(51) Int. Cl.
| | |
|---|---|
| *G06F 16/23* | (2019.01) |
| *H04L 29/08* | (2006.01) |
| *G06F 16/2455* | (2019.01) |
| *G06F 16/9038* | (2019.01) |
| *G06F 16/9535* | (2019.01) |
| *G06F 16/903* | (2019.01) |
| *H04L 29/06* | (2006.01) |

(52) U.S. Cl.
CPC .......... *G06F 16/23* (2019.01); *G06F 16/2455* (2019.01); *G06F 16/9038* (2019.01); *G06F 16/90335* (2019.01); *G06F 16/9535* (2019.01); *H04L 67/1002* (2013.01); *H04L 67/16* (2013.01); *H04L 67/20* (2013.01); *H04L 67/26* (2013.01); *H04L 67/42* (2013.01)

(58) Field of Classification Search
CPC ....................................................... H04L 67/16
See application file for complete search history.

(56) References Cited

U.S. PATENT DOCUMENTS

| | | | |
|---|---|---|---|
| 6,853,642 B1 * | 2/2005 | Sitaraman | ............... G06F 9/505 370/395.4 |
| 2004/0255302 A1 | 12/2004 | Trossen | |
| 2006/0004693 A1 * | 1/2006 | Ramanathan | ......... G06F 16/907 |

(Continued)

FOREIGN PATENT DOCUMENTS

WO        0186419  A2     11/2001

OTHER PUBLICATIONS

Inserting a New Record from the GridView's Footer (C#) written by Scott Mitchell, https://docs.microsoft.com/en-US/aspnet/web-forms/overview/data-access/enhancing-the-gridview/inserting-a-new-record-from-the-gridview-s-footer-cs, Mar. 5, 2007, (Year: 2007).*

(Continued)

*Primary Examiner* — Hau H Hoang
(74) *Attorney, Agent, or Firm* — Amin, Turocy & Watson, LLP

(57) ABSTRACT

The described technology is generally directed towards matching subscriber services to publisher services based on any number of arbitrary subscriber-specified attributes. In general, each publisher services register its capabilities as a set of attributes in a repository data store, e.g., a database. When a subscriber service wants a matching publisher service, the subscriber service specifies which attributes the subscriber service wants matched, and the repository's affiliated matching process uses the registered attributes of the publisher services to seek a match.

20 Claims, 11 Drawing Sheets

(56) References Cited

U.S. PATENT DOCUMENTS

| | | | | |
|---|---|---|---|---|
| 2007/0033261 | A1* | 2/2007 | Wagner | H04L 29/06 709/217 |
| 2007/0162478 | A1* | 7/2007 | Hall | H04L 67/16 |
| 2007/0168479 | A1* | 7/2007 | Bean | H04L 67/16 709/223 |
| 2008/0065656 | A1* | 3/2008 | Theeten | G06F 16/84 |
| 2010/0191796 | A1* | 7/2010 | Almeida | G06F 9/5027 709/202 |
| 2014/0236935 | A1* | 8/2014 | Doebele | G06Q 50/01 707/723 |
| 2015/0269257 | A1* | 9/2015 | Edlund | G06F 17/30864 707/770 |
| 2016/0149769 | A1* | 5/2016 | Joshi | H04L 41/5006 715/739 |

OTHER PUBLICATIONS

QoS-based Web Service Selection Using Filtering, Ranking and Selection Algorithm written by Tajudeen Adeyemi Ajao (hereafter Ajao), International Journal of Scientific & Engineering Research, vol. 4, Issue 7, Jul. 2013, p. 184-190 (Year: 2013).*

International Search Report and Written Opinion dated Mar. 16, 2018 for International Application Ser. No. PCT/US2017/068785, 17 pages.

Guttman, "Service Location Protocol: Automatic Discovery of IP Network Services," IEEE Internet Computing, Institute of Electrical and Electronics Engineers, US, vol. 3, No. 4, Jul. 1, 1999 (Jul. 1, 1999), pp. 71-80, XP002140936.

Communication pursuant to Article 94(3) EPC for European Application No. 17 835 978.2 dated Jun. 25, 2020, 6 pages.

Tajudeen Adeyemi Ajao et al: "QoS-based Web Service Selection Using Filtering, Ranking and Selection Algorithm" International Journal of Scientific & Engineering Research, Jul. 1, 2013 (Jul. 1, 2013), XP055706890,Retrieved from the Internet: URL:https://www.ijser.org/onlineResearchPaperViewer.aspx?QoSbased-Web-Service-Selection-Using-Filtering-Ranking-andSelection- Algorithm. pdf [retrieved on Jun. 19, 2020].

Raj R J R et al: "Web service selection based on QoS Constraints", Trendz in Information Sciences&Computing (TISC), 2010, IEEE, Dec. 17, 2010 (Dec. 17, 2010), pp. 156-162, XP031978666, DOI:10.1109/TISC.2010.5714629 ISBNN: 978-1-4244-9007-3.

Communication pursuant to Rules 161(1) and 162 EPC received for EP Patent Application Serial No. 17835978.2 dated Sep. 24, 2019, 3 pages.

EP Office Action for EP Application No. 17835978.2 dated Mar. 23, 2021, 5 pages.

* cited by examiner

SERVICE DISCOVERY USING ATTRIBUTE MATCHING

BACKGROUND

In distributed computing systems, a subscriber service comprises a service/network application that wants to use another service, referred to as a publisher service, which exports some functionality desired by the subscriber service. Service discovery in large-scale distributed systems is generally directed towards matching a subscribing service to the correct version of a published service.

Contemporary subscriber service discovery of available publisher services is limited to discovering publisher services based upon IP addresses, protocols, and versions. More particularly, service discovery solutions are either at OSI Level 4 (Transport Layer) or OSI Layer 5 (Session Layer); at the Transport Layer, discovery is possible based on mapping service names to IP addresses and TCP/UDP protocols and ports, while Layer 5 handles mapping names to RPC sessions between endpoints. As a result, a subscriber service is limited to the endpoint information at the transport and session layer and has to adapt to whatever capabilities such a matched publisher service has to offer.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards matching publisher services to subscriber services based upon any number of application defined (e.g., including Layer 7) attributes. Described herein is receiving a request for matching publisher service data as part of discovery operations of a subscriber service. The request is associated with a set of arbitrary attributes to match against the publisher service data. One or more aspects are directed towards matching the set of arbitrary attributes to one or more publisher services that have each registered one or more attributes as a registered attribute set in a repository. If at least one publisher service is a matched publisher service, a set identifying at least one matched publisher service in response to the request.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
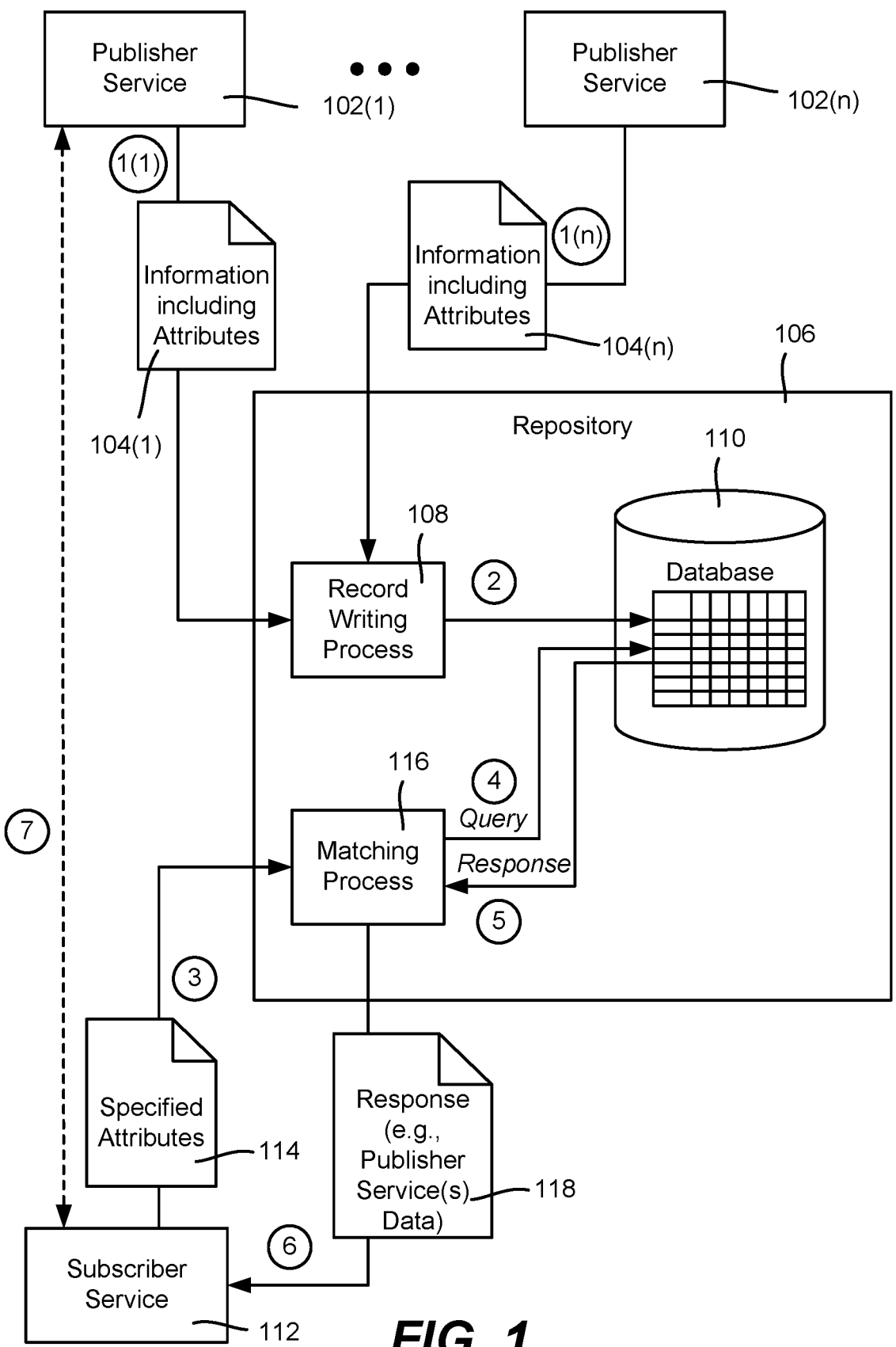
FIG. 1 is an example block diagram representation of a publisher service, subscriber service and repository environment in which attribute matching may be performed to match a subscriber service to a publisher service, according to one or more example implementations.

Various aspects of the technology described herein are generally directed towards subscriber service-to-publisher service discovery, in which subscriber services are matched to publisher services based upon matching some of a virtually unlimited number of arbitrary application-defined attributes. Note that as used herein, "arbitrary" refers to the ability of a subscriber service to specify a number (any one or more) attribute types and one or more values for each type, and the ability of a publisher to register a number (any one or more) attribute types and one or more values for each. Further, the attributes are arbitrary in that the technology is extensible to add new types of attributes over time, and in that only an arbitrary subset of those available attributes may be specified by a subscriber service to match an arbitrary subset registered by a subscriber service. It is understood that to have a match, the subscriber service and a matched publisher service need to both understand and agree on the meaning of any arbitrary attribute type and value that needs to be matched.

In general, the subscriber service is matched to a publisher service if the subscriber service's specified attribute set matches a publisher service's registered attribute set. Note that the subsets need not exactly match, e.g., a subscriber service may request a publisher service that matches values specified for certain attribute types; the subscriber service may have more attribute types and values registered, but a match only need satisfy the attribute type(s) and value(s)

specified by the subscriber service. In other words, an application (subscriber service) specifies a set of arbitrary attributes, and a publisher service is matched to that subscriber service based upon satisfying the predicates associated with the specified attributes. In one or more implementations, the specified attributes may be user defined, using declarative statements or the like. Note further that as described herein, when multiple publisher services satisfy a subscriber services's request, it is possible to user more than one publisher service, e.g., to balance the subscriber's load in some way across multiple instances of the publisher service.

In one or more implementations, generally based upon and described in U.S. patent application Ser. No. 15/291,816, assigned to the assignee of the present application and herein incorporated by reference in its entirety, parameter data maintained in a configuration file is used to make a subscriber service's calls to a publisher service, (instead of making calls via a static configuration). As a result of using such variable parameter data, a subscriber service may request to be matched to a publisher service that can meet any set or subset of parameter data that can be specified in a configuration file. Once matched, the publisher service and subscriber service communicate, e.g., over TCP/IP, UDP, REST, and/or RPC calls, to perform some desired functionality.

In general, before becoming available, each publisher services register its capabilities (comprising the parameter data, generally referred to herein as "attributes") in a repository. When a subscriber service wants a matching publisher service, the subscriber service specifies (in a subscriber service discovery runtime) what attributes the subscriber service wants matched. The repository's affiliated matching process uses the registered publisher services' registered attributes to seek a match with the subscriber service's specified attributes. Via this mechanism, instead of being limited to matching only IP addresses, protocols, and versions, virtually any number of arbitrary attributes may be matched, including those at the OSI Level 7 (application layer). Such attributes may include (but are not limited to) these listed in TABLE 1:

TABLE 1

| | | |
|---|---|---|
| (1) | Name, Protocol | |
| (2) | URI overrides to override service discovery and use an embedded URI, API | |
| (3) | (Implementation) Version | |
| (4) | Load balancing policies which may include (but are not limited to): | |
| | a. | Round-robin |
| | b. | Least connections |
| | c. | Hashed source |
| | d. | Random load balancing (or no policy) |
| | e. | Sticky |
| | f. | Latency sensitive load balancing. |
| | g. | Weighted load balancing. |
| (5) | customized health checking attributes | |
| (6) | rate (period) of health checking | |
| (7) | API call rate control | |
| (8) | retry policy (e.g., constant backoff, linear backoff, exponential backoff, maximum retries, no retries, etc.) | |
| (9) | type of marshalling such as binary (e.g., Google ® Protobufs, Apache Avro ™, Apache Thrift ™), or plain text (e.g., JSON, XML, raw text), etc. | |

By way of example, consider that a subscriber service operates efficiently as long as publisher service health checks are performed not more than once per second. The subscriber service thus seeks a publisher service that performs health checks at a rate of not more than once per second. During service discovery, the subscriber service specifies this attribute (possibly along with others), and a publisher service that meets the specified attribute set is discovered, (assuming such a publisher service with this capability exists and is accordingly registered). In one or more implementations, registration and matching discovery to determine a publisher service may be accomplished by various components incorporated into or otherwise coupled to the repository, (as well as to an extent by the subscriber service discovery runtime).

Note that some of these results may be cached on the client (subscriber service) side, which reduces the latency of making a round-trip to the server/repository. When caching is used, the subscriber service needs to be concerned about cache invalidation, because the attribute data in the repository may change. Cache invalidation can happen via one or more repository notifications and/or as client-side exceptions on legitimate calls. Cache invalidation may be done transparently, e.g., the subscriber discovery runtime has appropriate retry policies that allow for cache invalidations, repopulation of the cache with correct data, and reissuing the call.

It should be understood that any of the examples herein are non-limiting. For instance, some of the examples refer to a centralized repository having certain features including processes. However, the technology described herein is independent of any particular repository design, and any suitable such component or set of components may be used, including external processes coupled to a repository; further, the repository may be centralized or distributed. Further, some of the matching-related operations may be performed by the subscriber service discovery runtime; e.g., the repository may return multiple matching publisher services, from which the subscriber service selects one for use. Still further, many of the examples herein use equality predicates as one type of predicate, but the technology is not restricted to equality matching and may evaluate generalized predicates for matching. Thus, any of the embodiments, aspects, concepts, structures, functionalities or examples described herein are non-limiting, and the technology may be used in various ways that provide benefits and advantages in data communication and data processing in general.

As shown in FIG. 1, to make themselves available for use, publisher services 102(1)-102(n) register information 104(1)-104(n), respectively, with a repository 106. In accordance with the technology described herein, the various information 104(1) and 104(n) include capabilities of the respective publisher services 102(1)-102(n), in the form of attributes, as represented by the labeled arrows 1(1) and 1(n), respectively. Note that there may be publisher services on the order of thousands, and that publisher service registrations need not occur at the same time and can occur whenever a publisher service instance is started.

In one or more implementations, as part of registration, registration logic comprising a record writing process 108 or the like, which may be incorporated into the repository 106 or coupled thereto (e.g., as an external service) writes the attributes as database records to a database 110 within (or coupled to) the repository 106, as represented by arrow two (2). The publisher service (e.g., a sidekick process therein, rather than the repository 106) may comprise the record writing process 108.

Note that a database (e.g., a table) is only one suitable way to record the publisher services' attributes; indeed any data store/data storage resource that can store the attributes in conjunction with a publisher service's identifying information (e.g., a name or other ID, and/or an IP address) and can be searched for a match may be used instead of (or in addition to) a database. For example, it is typical for repositories to use a hierarchical file system. Some repositories may simulate a hierarchy in a flat key-value store by storing the directory path to an item as a key. Still further, in one or more implementations, the repository is not a database as conventionally understood, but instead comprises a key value store, (e.g., part of or all of the key value store 332 of FIG. 3).

Thus, while the repository need not be a full-capability database and instead may be a more basic key-value store, it is understood that any database that offers rich querying functionality (which may include rich predicate processing) may be used. Some of the favorable properties of a repository include high performance with scalable transaction rates to support queries/updates from, and notifications to large numbers of publishers and subscribers; the ability to perform simple Boolean queries at either the subscriber and/or publisher side, or at the repository; highly available storage; and reliable and consistent replicated storage and distributed storage.

In one alternative implementation, when a subscriber service 112 requests a registered publisher service (arrow three (3)), the subscriber service 112 specifies any number of attributes 114 that are to be matched. A matching process 116, such as one that formulates and makes a corresponding database query, key-value store query or the like (arrow four (4)), returns a matching publisher service's data 118 (arrows five (5) and six (6)) if a match is found. Such data may include a publisher service IP address (or ID by which the IP address may be located) along with any information that may be needed to initiate communication with/listen to events of the publisher service. It is also feasible to return the information for more than one publisher service, such as to allow the subscriber service to make a choice, as described below. Further, the subscriber service may choose to use more than one matching publisher service, such as for load balancing across multiple publisher services. The matching process 116 also may return a suitable message if no match is found. Note that as set forth above, if there are multiple matched publisher service servers, there may be a selection made by the repository 106 and/or the subscriber service 112 (or an entity coupled to the subscriber service, for example). Also, multiple publisher service instances may be returned as described herein.

Once matched to a publisher service, the subscriber service 112 then communicates with the matched publisher service (e.g., the publisher service 102(1)), based upon the specified attributes as represented by dashed arrow seven (7). The communication may be direct, but as with publisher and subscriber services need not be direct, such as if the publisher service sends events to an intermediary, with relevant events then routed to the subscriber service; (the subscriber service alternatively may receive all events of the publisher service and filter out those not relevant).

Figure 2:
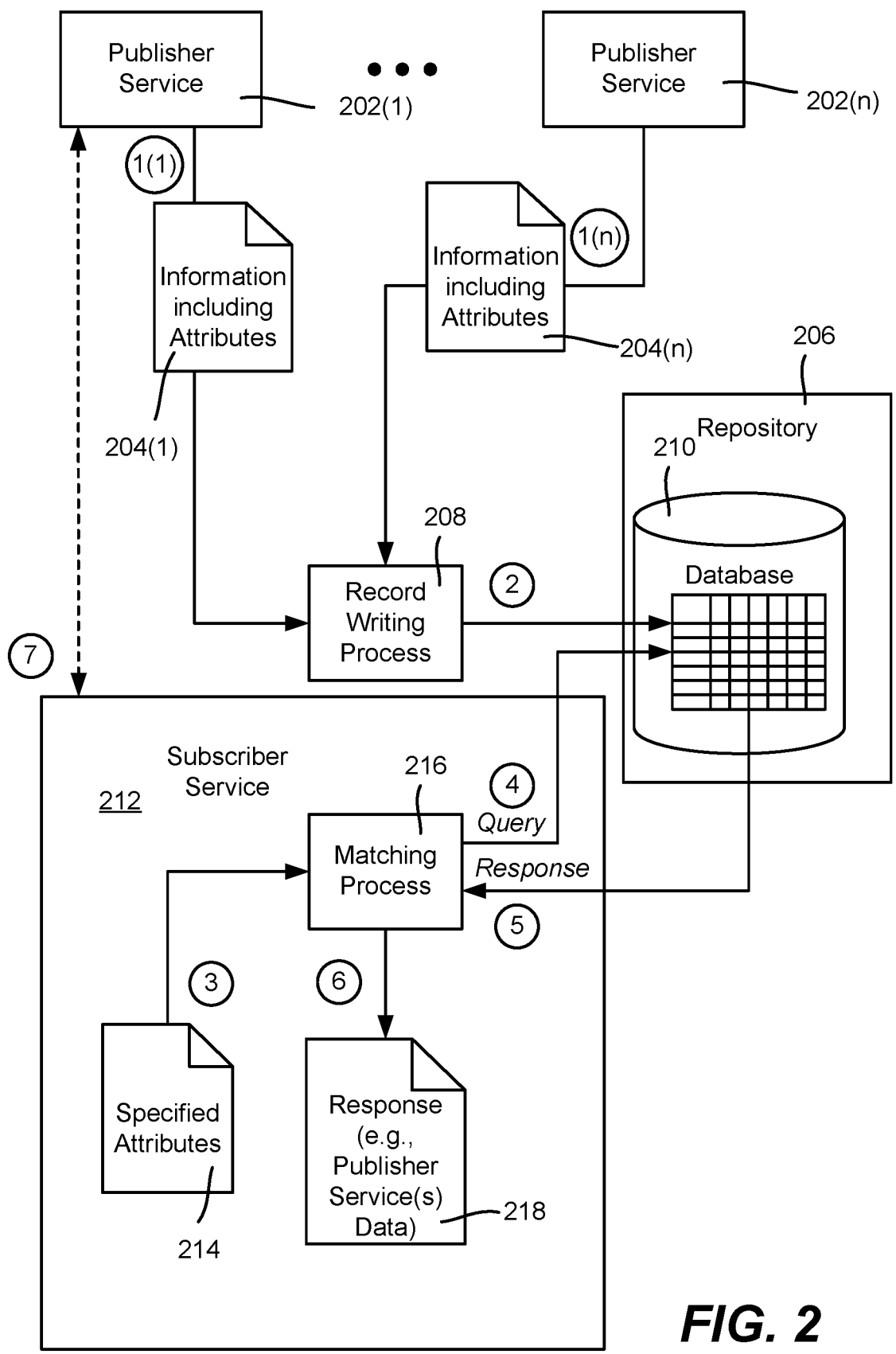
FIG. 2 is an example block diagram representation of a publisher service, subscriber service and repository environment in which attribute matching may be performed at the subscriber service to select one or more publisher services, according to one or more example implementations.

FIG. 2 shows an alternative implementation in which a subscriber service (client) 212 contains the matching process 216. In this subscriber service-side model, the client makes the query based upon the desired attribute set and obtains one or more matching publisher services to use.

Note that each publisher service may include an instance of a record writing process. Indeed, any combination of the concepts of FIGS. 1 and 2 are feasible. For example, certain publishers may know how to write their attributes to the repository, whereas others may provide a declarative list of attributes that another entity coupled to or incorporated into the repository (such as the record writing process 108) processes into a record or key-value data for writing to the repository data store. Similarly, a subscriber service can make queries and process results, or provide a list to a matching process coupled to or incorporated into the repository, with the results processed before returning to the subscriber service, at the subscriber service, or via a combination of both before and at the subscriber service.

Figure 3:
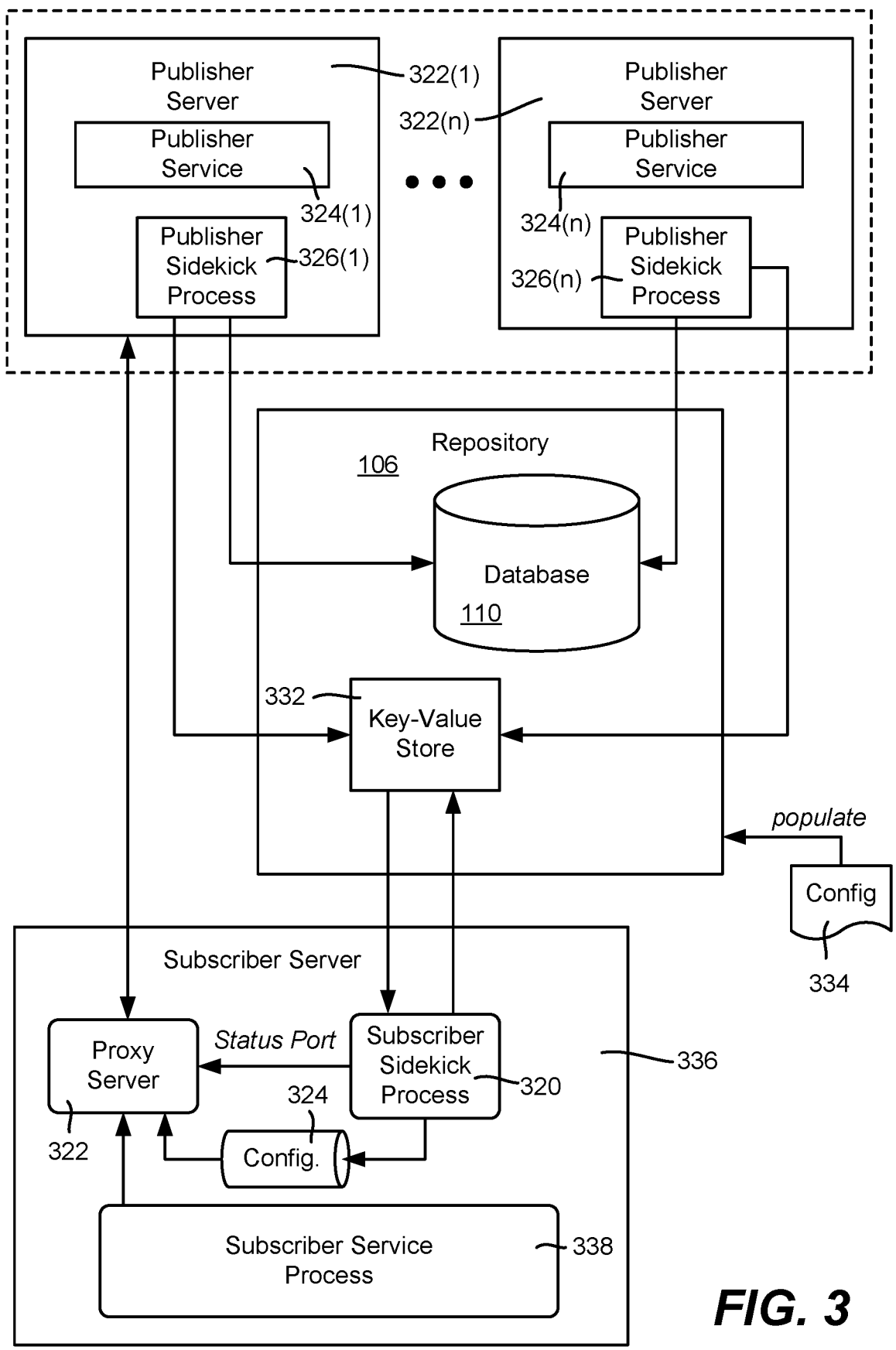
FIG. 3 is an example block diagram representation of a publisher service/subscriber service environment in which arbitrary communication attributes and other arbitrary attributes may be selected to match a subscriber service with a matched publisher service, according to one or more example implementations.

Once discovered and communicating, as generally represented in the example implementation of FIG. 3, during operation the exemplified publisher service servers 322(1)-322(n) each include a publisher service that exports some service functionality, shown in FIG. 3 as publisher services 324(1)-324(n), respectively. As set forth above, in a typical scenario, there may be thousands of publisher services (and thousands of subscriber services). Services can fail fast, and may be ephemeral, volatile and/or dynamic. Servers and/or services may be co-tenanted on the same virtual machine and/or physical machine; note that a virtual machine may or may not be the smallest unit of deployment, as there may be processes, threads, co-routines, containers and so on. Multiple instances of multiple versions of a service may be running concurrently. There may be multi-datacenter and cross-regional access to deployed services. In one or more implementations rapid deployment is available to support automatic scaling to react to workload peaks, along with integrated load-balancing across service instances.

In general, each publisher service server 322(1)-322(n) includes a publisher service registration component that runs as a publisher service sidekick process, shown as 326(1)-326(n), respectively. Each of the publisher service sidekick processes 326(1)-326(n) provides for service registration to the repository 106, as well as performing other operations as described herein.

In general, in one or more implementations, the repository 106 is a highly-available, distributed, repository including a database 110/key value-store 332 that maintains the publisher services' registrations. The repository 106 may be replicated; (consistency may need to be maintained across replicas to ensure that real time queries result in deterministic results). As described herein, the repository 106 also includes, is coupled to or is incorporated into a service registry comprising a key-value store 332, (or multiple key-value stores), which may be monitored for changes related to the registered publisher services 324(1)-324(n).

The database 110 may be updated by the publisher service sidekick processes 326(1)-326(n). The repository 106 including the database 110 and key-value store 332 (which may be the same entity) also may be configured/updated/populated by an external configuration source 334, such as an administrator, automated process, and so on.

FIG. 3 also shows a subscriber service server 336 including a subscriber service process 338, subscriber service sidekick process 320 and proxy server 322. As described herein, the subscriber service process 338 makes service calls through a proxy server 322, which uses a configuration file 324 (and/or another suitable data structure, including in-memory accesses by the proxy server) to communicate with a discovered publisher service, exemplified in FIG. 3 as the publisher service 324(1).

Note that the technology described herein allows a publisher service to be a subscriber service to other services, and vice versa. This allows chained service-to-service calls, e.g., where Service A calls Service B which calls Service C which calls Service D and so on.

Service discovery in the environment exemplified in FIG. 3 generally follows the service discovery pattern for modern distributed architectures. However, as will be understood, the publisher service sidekick process (e.g., 326(1)) provides for enhanced generic service registration while the subscriber service sidekick process 320 provides for enhanced service discovery. The publisher service sidekick process (e.g., 326(1)) and the subscriber service sidekick process 320 also participate in health checking, which in general removes unhealthy and/or non-communicating publisher services from the system. The repository 106 handles service discovery out-of-band of the application. Service discovery components run locally on the machine at well-known ports. Service discovery may be abstracted away, with no need to find discovery publisher service bindings.

Figure 4:
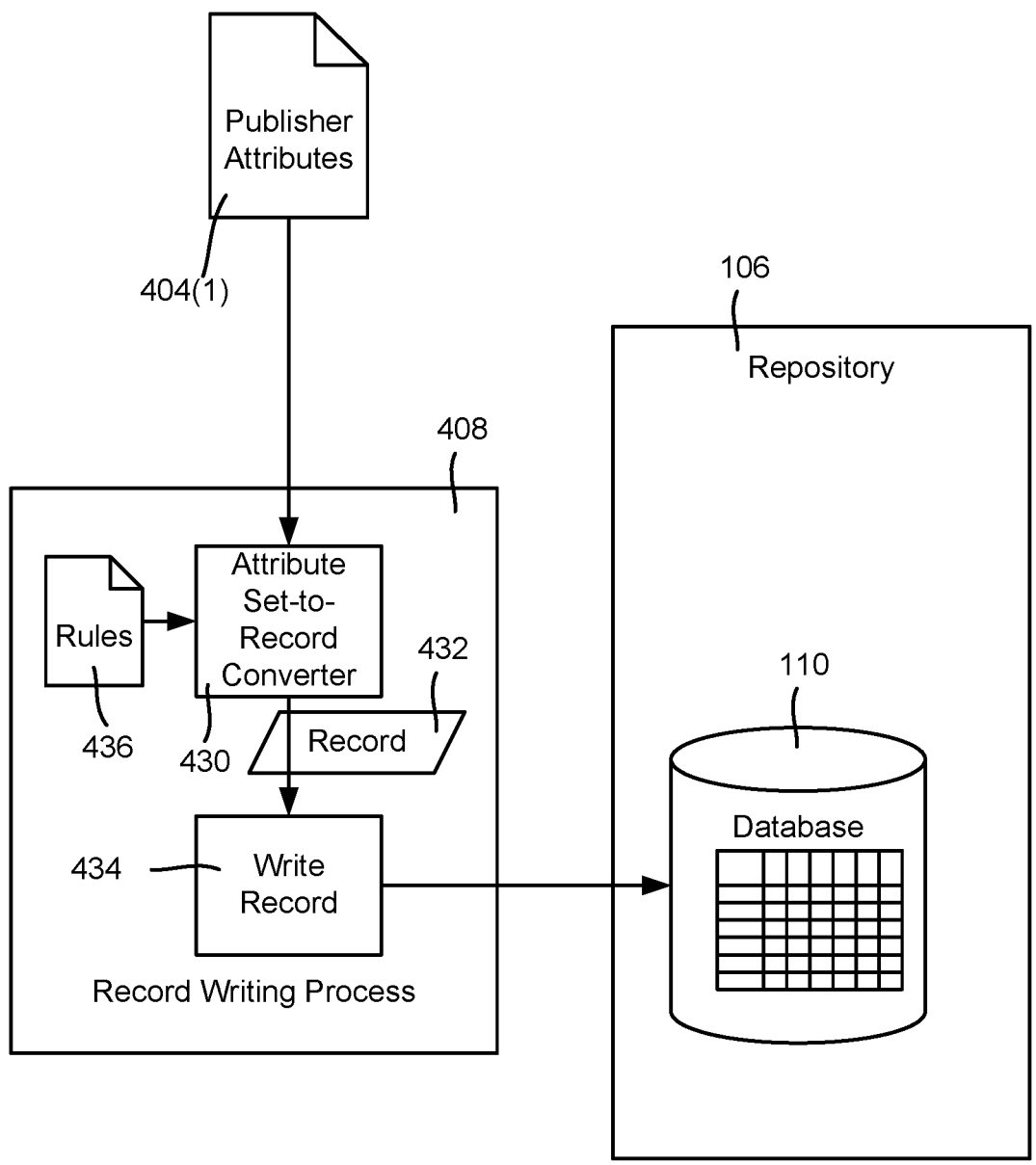
FIG. 4 is an example block diagram representation of how a publisher service may register a set of arbitrary attributes (including types and values) with a database/key-value store (of a repository) for subsequent matching by subscriber services, according to one or more example implementations.

FIG. 4 shows additional details on how a publisher service may register itself as a publisher service in association with its set of attributes 404(1). In this example, a record writing process 408 includes logic (an attribute set-to-record converter 430) that converts the set of attributes 404(1) into an appropriate record format 432, which is then written to the database 410 by a write record operation 434. Note that some attributes in the publisher-provided set may be left out of the set or otherwise indicated as not specified. For example, the publisher service may not care about a certain attribute (e.g. there are no URI overrides), a certain attribute may be nonsensical for that type of publisher service, a new attribute may be defined and used by some publisher services and subscribers services but this this particular publisher service does not support such subscriber services so is not to be matched to them (and thus need not have to update its attribute set), and so on. As set forth herein, the record writing process/logic 408 may be incorporated into any publisher service, (e.g. in its sidekick process), may be incorporated into the repository, and/or may be an external entity coupled to the publisher service and the repository.

By way of example of converting publisher service attributes to a record format, consider that the publisher service attributes are set forth as a list in a declarative language, e.g., {name=X, version=2.2 . . . }. The attribute set-to-record converter 430 puts the information into relevant fields of a record according to a set of rules 436 or the like. The rules 436 may be updated from as needed, e.g., as new attributes become available, as long as the subscriber service-specified attributes use similar rules to formulate queries as described below.

A record may have more than one field for an attribute type (e.g., exemplified in TABLE 1), or may have a single field with multiple sets of information for an attribute type. For example, a publisher service may support three load balancing policies, such as round-robin, hashed source and latency sensitive load balancing. In the database record for that publisher service, a single load balancing policy field with a binary bit pattern can indicate which are supported and which are not, e.g., 1010010xxxxx (with x bits reserved for the future). Alternatively there may be a number of load balancing policy fields in a publisher service's record, one field for each possible type of load balancing policy, with a yes/no value or the like indicating whether that type is supported or not.

A record may have one or more associated fields that have a maximum and minimum value, respectively. For example, a service may allow a rate of health checking from 0.5 seconds to 1.0 seconds. This may be specified in a single field or in two fields, e.g., allowed max health checking period is 1.0 seconds, allowed min health checking period is 0.5 seconds. A "preferred" field also may exist by which a publisher service may specify its own "optimal" data, e.g., max=1.0, preferred=0.8, min=0.3. As can be readily appreciated, virtually any data storage container (e.g., record) may be used with virtually any fields and rules, as long as the discovery service can match a subscriber service's specified attribute set (e.g., a "list") to the publisher services' storage containers.

Figure 5:
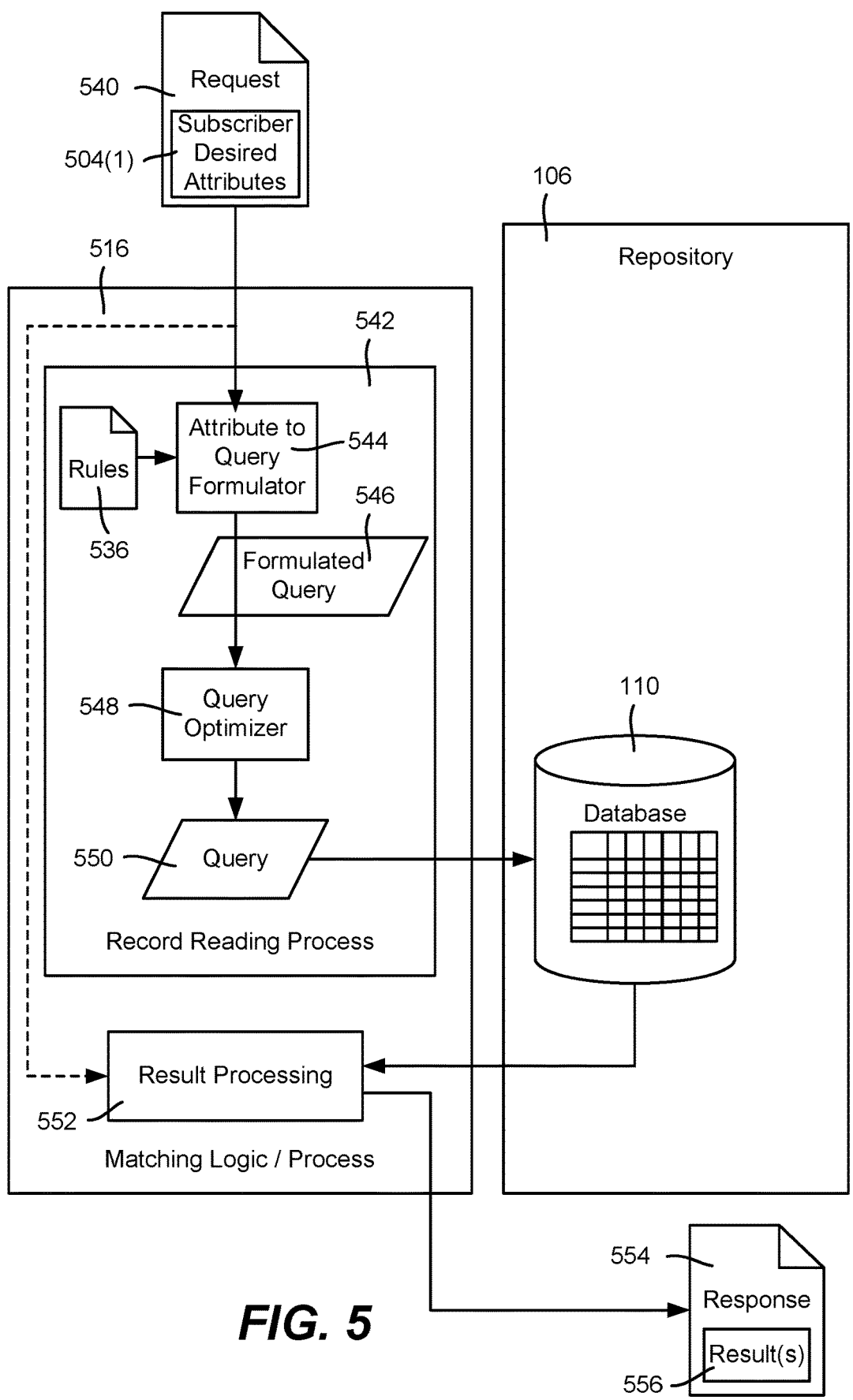
FIG. 5 is an example block diagram representation of how matching logic of a repository matches a subscriber service to publisher services by matching subscriber service-specified attributes to registered attributes publisher services, according to one or more example implementations.
Figure 6:
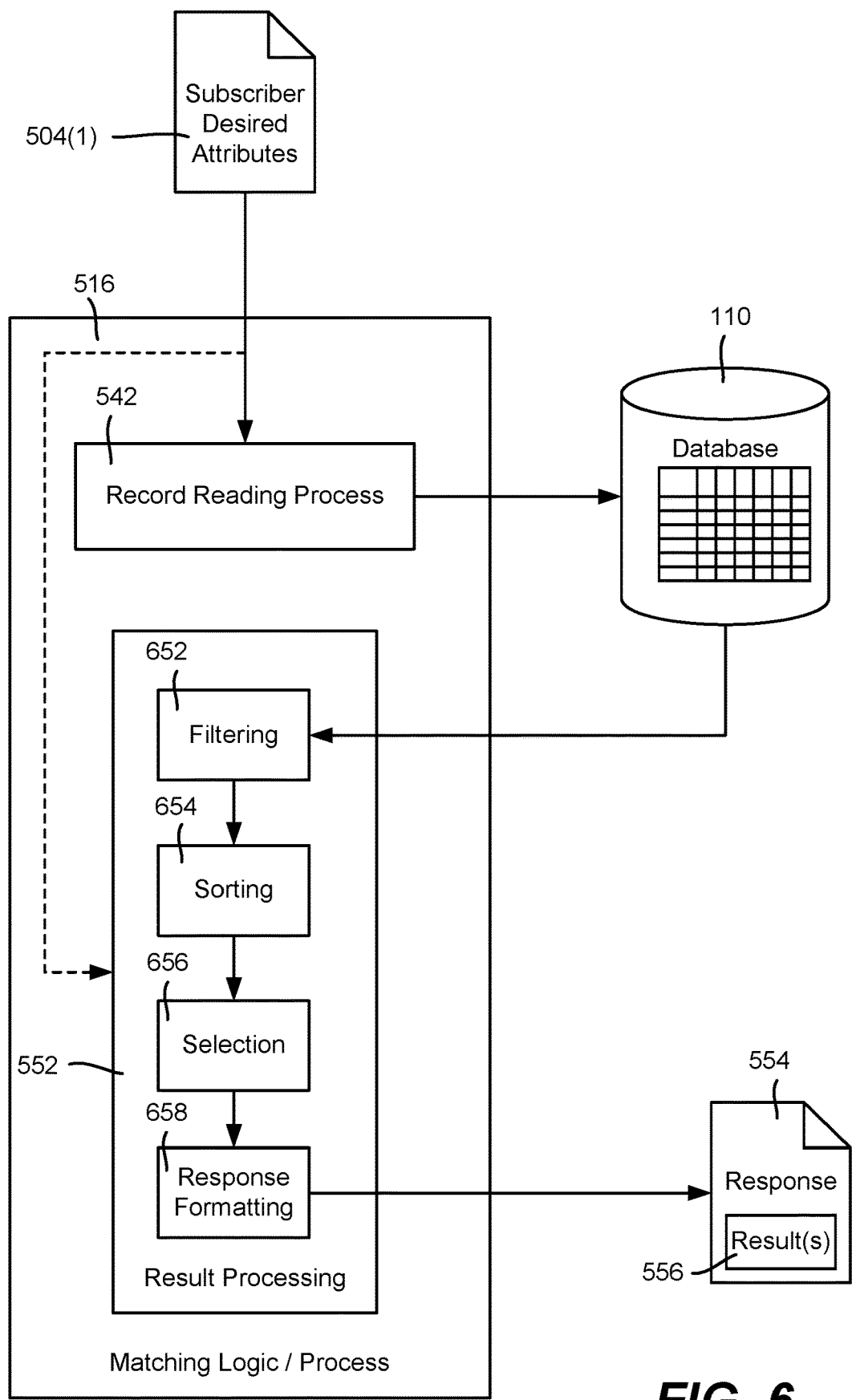
FIG. 6 is an example block diagram representation of how matching logic of a repository may process one or more matching publisher services into results for returning to a subscriber service, according to one or more example implementations.

FIGS. 5 and 6 show how a subscriber service may specify, as part of its discovery runtime, the attributes it wants to be matched to a publisher service. As set forth herein, in various implementations, the matching process 516 including the record reading process/logic 542 and/or the result processing logic 552 may be incorporated into the subscriber service, (e.g. in its sidekick process), may be incorporated into the repository, and/or may be an external entity coupled to the subscriber service and the repository.

Instead of a conventional find publisher service request, the subscriber service discovery runtime described herein provides a request 540 that further includes any desired attributes 504(1), e.g. in a declarative language list. A matching process 516 includes the record reading process 542 having an attribute-to-query formulator 544 that processes the specified attributes into a formulated (appropriately formatted) database query 546, using rules 536 similar to those rules used to format each publisher service's attributes into a written record. As is known, a query optimizer 548 or the like may be used to make the query 546 more efficient before the actual database query 550 is made.

The matching record or records that are returned (if any) are processed (block 552) into a response 554. The response includes a set of results 556, which may be NULL, may identify a publisher service or multiple publisher services, and may provide information on how to communicate with the publisher service, provide the attributes of the publisher service, and so forth. It is also feasible to return results identifying more than one matching publisher service to the subscriber service discovery runtime, so that the subscriber service may make a selection, or may load balance across all of them or some of them. For example, a subscriber service may choose to initially not specify a particular attribute in its specified attribute set, get back several publisher services, and thereafter make a choice based upon that particular unspecified attribute, if there are differences identifiable in the returned response. A limit on the number of matching publisher service instances may be established by the repository matching process 116 (FIG. 1) or may be specified by the subscriber service; the limit may be a default value if not specified. For example, a very broad query may return hundreds of matching publisher service instances. The repository matching process 116 can return any one publisher service instance, or some limited number, e.g., ten, such along with each one's attribute data, whereby the subscriber service can make a choice as described herein.

As described herein, data ranges may be used in matching. For example, a subscriber service may specify a desired range for the rate (period) of health checking of 0.5 to 1.0 seconds, e.g., "rate of health checking=0.5 to 1.0 seconds" or the like. The query may be formulated to include a range query that specifies 1.0 seconds as the upper boundary and 0.5 seconds as the lower boundary, or other filtering techniques may be used to eliminate non-matching publisher services. Note that as set forth above the publisher service may provide different maximum and minimum values. However, even in an implementation where if the publisher service does not provide different maximum and minimum values (e.g., the publisher service lists 0.7 for both maximum and minimum values, or the record is such that only one value may be provided), such a query can locate that publisher service because 0.7 is between the range values specified.

As is understood, in one or more implementations a declarative language is used for specifying a publisher service's actual attributes and a subscriber service's desired attributes, such as "Load balancing policy=Weighted" and so forth. Notwithstanding, this is only one way to specify attributes that is convenient for human users; indeed, any (attribute type/ID, value) system may be used. For example, for shorthand, some of the examples herein more simply refer to an attribute type identifier followed by some specified value, e.g., attr6=Q.

Boolean operators may be used in specifying attributes, (although for user convenience, the AND operator may be inherent; e.g., specifying an attribute set such as:

attr1=X attr2=Y attr3=Z can be interpreted to mean {attr1=X AND attr2=Y AND attr3=Z}).

An OR operator, if understood by the repository matching process, allows for any two or more publisher service attributes to be matched. For example, consider that a subscriber service requests a publisher service with attribute set {attr1=A, attr2=B, attr3=C1 OR C2, attr4=Y}. This allows the subscriber service to specify a publisher service to be matched if the publisher service meets the {A, B, C1, Y} or {A, B, C2, Y} attribute set for attributes attr1-attr4, respectively. Note that the OR operator is inherent for anything not specified; in the above example, attribute attr5 is not specified, whereby the subscriber service does not care what the publisher service does with respect to this attribute, that is, a publisher service may be matched whether it specifies attr5 and a value (or set or range of values) for that attribute or not.

In one or more implementations, the NOT operator allows for exclusion filtering, e.g., {attr1=A, attr2=B, attr3=NOT X, attr4=Y}. For example, X may represents version 1.0, whereby any publisher service that matches these other three attributes {attr1=A, attr2=B, attr4=Y} but is something other than version 1.0 may be returned. Filtering may be used for exclusion if the query is not able to designate such an exclusion (or can do so, but only in a complicated operation).

A greater than or less than value may be specified by the subscriber service discovery runtime, e.g., "Version>=2.0" (in a declarative form) means that any publisher service below version 2.0 is not a match. Any scheme that communicates the desired attributes and is understood by the publisher service, subscriber service, record writer and query formatter may be used.

Thus, it is understood that the matching is not limited to equality matches, and may be matching based upon evaluating predicates. Indeed, matching criteria may be generalized to include any predicate (any Boolean function evaluating to true or false, e.g., with a match made when a predicate evaluates to true). Other examples of straightforward predicate expressions include <, >, ≤, ≥ with conjunctions and disjunctions using ANDs and ORs, respectively. It is also understood that predicate expressions can be much more complex functions than those exemplified herein, (even if rarely used in many scenarios).

Instead of a Boolean OR operator that may provide an equal choice for an attribute type, a subscriber service may specify an "OR-like" operation with preferences in the set of desired attributes. For example, a desired attribute set may specify {attr1=A, attr2=PREFER B1 OVER B2, attr3=C1 OR C2, attr4=Y}. This, for example, means that a publisher service having attribute set {attr1=A, attr2=B1, attr3=C1, attr4=Y} or another having {attr1=A, attr2=B1, attr3=C2, attr4=Y}, if either (or both) exists, is to be chosen over a publisher service having attribute set {attr1=A, attr2=B2, attr3=C1, attr4=Y} or {attr1=A, attr2=B2, attr3=C2, attr4=Y}. However, if neither exists, then it is acceptable to return a response identifying a publisher service having attribute {attr1=A, attr2=B2, attr3=C1, attr4=Y} or {attr1=A, attr2=B2, attr3=C2, attr4=Y} (or return both). Note that an alternative is to provide an ordering among "OR" attributes, e.g., attr1=T OR S means that a publisher service having the T attribute is preferred over one with the S attribute if records are matched for both; (although specifying preferences in this way is inconsistent with the usage of Boolean OR operators in general).

It is also feasible to specify more than two relative preference items, e.g., PREFER B1 OVER B2 OVER B3. Another possibility is to have multiple unrelated preferences in a set of attributes, e.g., {attr1=A, attr2=PREFER B1 OVER B2, attr3=PREFER C1 over C2, attr4=Y}. Another way to specify preferences is by weighting the attribute, e.g., where the value of the weight determines the priority of that attribute, e.g., {attr1=A, attr2=B1, w3.0, B2, w2.0} means attr2 prefers B1 with a weight of 3.0, over B2 with a weight of 2.0.

Still further, it is feasible to specify one preference for an attribute type over everything else of its type, e.g., {attr1=A, attr2=PREFER B1, attr3=C1 OR C2, attr4=Y}. In this situation, (assuming other attributes are matched), if a B1 record matches, then that publisher service may be returned. However, if no B1 record exists, then any publisher service that otherwise matches the other attributes may be returned as if B1 was not specified for attr2. Again, weighting may be alternatively used, such as have B2 with a weight greater than a default weight used for non-identified values, e.g., {attr1=A, attr2=B1, w2.0} in one or more implementations may mean that attr2 has B1 with a weight of 2.0 and every other possible value of attr2 with a smaller default weight, such as 0.0.

Another use of weighting attribute preferences is to attempt to obtain a number of publisher services according to a specified ratio. For example, {attr1=A, attr2=B1, w10.0, B2, w1.0} in one or more implementations may mean that the subscriber is seeking a ratio of ten publisher services with attr2=B1 to one publisher service with attr2=B2. This allows, for example, load balancing across as many publisher services as returned, but also allows for a publisher service with a different capability to be used, e.g., for evaluation, to collect metrics and so on for future consideration.

As can be readily appreciated, preferences and/or selection may be handled at the matching process 116 (FIG. 1) in a number of different ways. For example, one way to handle preferences is to retrieve matching records as if both (or three, four, etc.) were OR requests, and then filter and/or sort on the results.

Another way to handle preferences is by multiple, ordered queries. For such queries, e.g., {attr1=A, attr2=PREFER B1 OVER B2, attr3=C1 OR C2, attr4=Y}, the record reading process 542 (FIG. 5) can first query for "attr1=A AND attr2=B1 AND attr3=(C1 OR C2) AND attr4=Y". If no matching publisher service is found, then query with the next lesser preference, e.g., "attr1=A AND attr2=B2 AND attr3=(C1 OR C2) AND attr4=Y.

An option to handle preferences is to first determine whether or not a preference is a singleton (only one attribute in the set if specified as preferred, therefore that attribute value preferred over anything else for that type of attribute, such as {attr1=A, attr2=PREFER B}) or a relative preference pair (or a triplet, etc., such as {attr1=A, attr2=PREFER B1 OVER B2 OVER B3}). If a singleton, then one way to query is to first query with the singleton AND-ED to the other attributes of the query, that is, {attr1=A AND attr2=B}. Then, if the query returns no results, drop the singleton and query again without it, that is, query for {attr1=A}.

Multiple preferences in a request for publisher services can be problematic; for example, consider a set of attributes {attr1=A, attr2=PREFER B, attr3=PREFER C, attr4=PREFER D}, which when converted to {attr1=A, attr2=B, attr3=C, attr4=D} results in no matches. In this situation, it is not known which of the preference attributes caused the no match condition (or possibly nothing matched attribute A). Assuming attr1=A, when subsequently queried, does return multiple records (if only one matched, then the single matching publisher service result is returned), then it is known that no attr1=A record also satisfies these three preferences. However, multiple records may satisfy two of the three other preferences. For example, for attributes attr1-attr4, respectively, there may be one or more records having [A, B, C, *], or [A, B, *, D], or [A, *, C, D], (where the "*" represents any attribute value of this type). Similarly, there may be record(s) for only one of the three preferences, e.g., [A, *, C, *] or zero of three, [A, *, *, *]. Thus, a preference ordering scheme may be used, so that records are filtered and/or sorted based on the order specified. In other words, the subscriber service may order the attribute set to order among preferences, e.g., {attr1=A, attr4=PREFER D, attr2=PREFER B, attr3=PREFER C} to guide the repository's querying, filtering and/or sorting processes. In the ordered example, a publisher service with attributes attr1=A and attr4=D is returned as match before any publisher service without attr4=D. If there are multiple publisher services that match attributes attr1=A and attr4=D, then a publisher service with attributes attr1=A and attr4=D and attr2=B is returned as match before any publisher services that does not have attr2=B.

For efficiency when querying, a request may be broken up into multiple, contingent queries. For example, consider that a query is {attr1=A, attr2=PREFER B}. A first query may be made for records with {attr1=A, attr2=B}; if no records are found, then a subsequent query may be made for records in which {attr1=A}, since no attr1=A, attr2=B records exist.

Instead of (or in addition to) multiple queries, post-result filtering may be used by the matching process 516, such as represented in FIGS. 5 and 6 by block 552. For example, consider that in the above example a query for {attr1=A, attr2=PREFER B} is first made as {attr1=A}, which returns multiple (e.g., hundreds of) records. Because a preference for one attribute value attr2=B was specified, post-filtering (block 652 of FIG. 6) can filter out any records in which attr2 does not equal B. If none exist after filtering then the filtering results are not used, and the multiple records remain.

Sorting the records, represented in FIG. 6 by block 654, is another way of processing the query results. For example, after any filtering operation(s), there may be many records that still match. These records may be sorted according to some sorting rules; for example a request such as "attr3=PREFER C1 OVER C2" may sort (otherwise equivalent) records such that records containing C1 are ahead of records containing C2. Other criteria may be used in sorting; for example, statistics may be kept on how often a publisher service fails, how many other subscriber services are currently matched to a publisher service, publisher service response times, and so on. Such information may be used to rank one publisher service over another with respect to sorting.

Selection, represented in FIG. 6 by block 656, is another operation that may be performed by the matching process. A straightforward type of selection is described above, namely select some number of publisher services up to a limit, which may be a repository-fixed limit, or a repository-default limit overridden by any subscriber service-specified limit (possibly up to a maximum). In this way, the subscriber service can delegate selection to the repository, at least to an extent. If more than one publisher service is returned, it is the responsibility of the subscriber service to make a selection (or possibly use them all), as described below with reference to FIGS. 9 and 10.

Note that filtering, sorting and/or selection may work with one another. Consider for example that after filtering, many thousands of publisher service records still match. Instead of sorting these, a preliminary selection operation may first narrow the records (e.g., randomly or based upon some other scheme) to a more manageable number, such as one-hundred, which then may be sorted, with a final selection made after sorting, e.g., based upon a limit.

Figure 7:
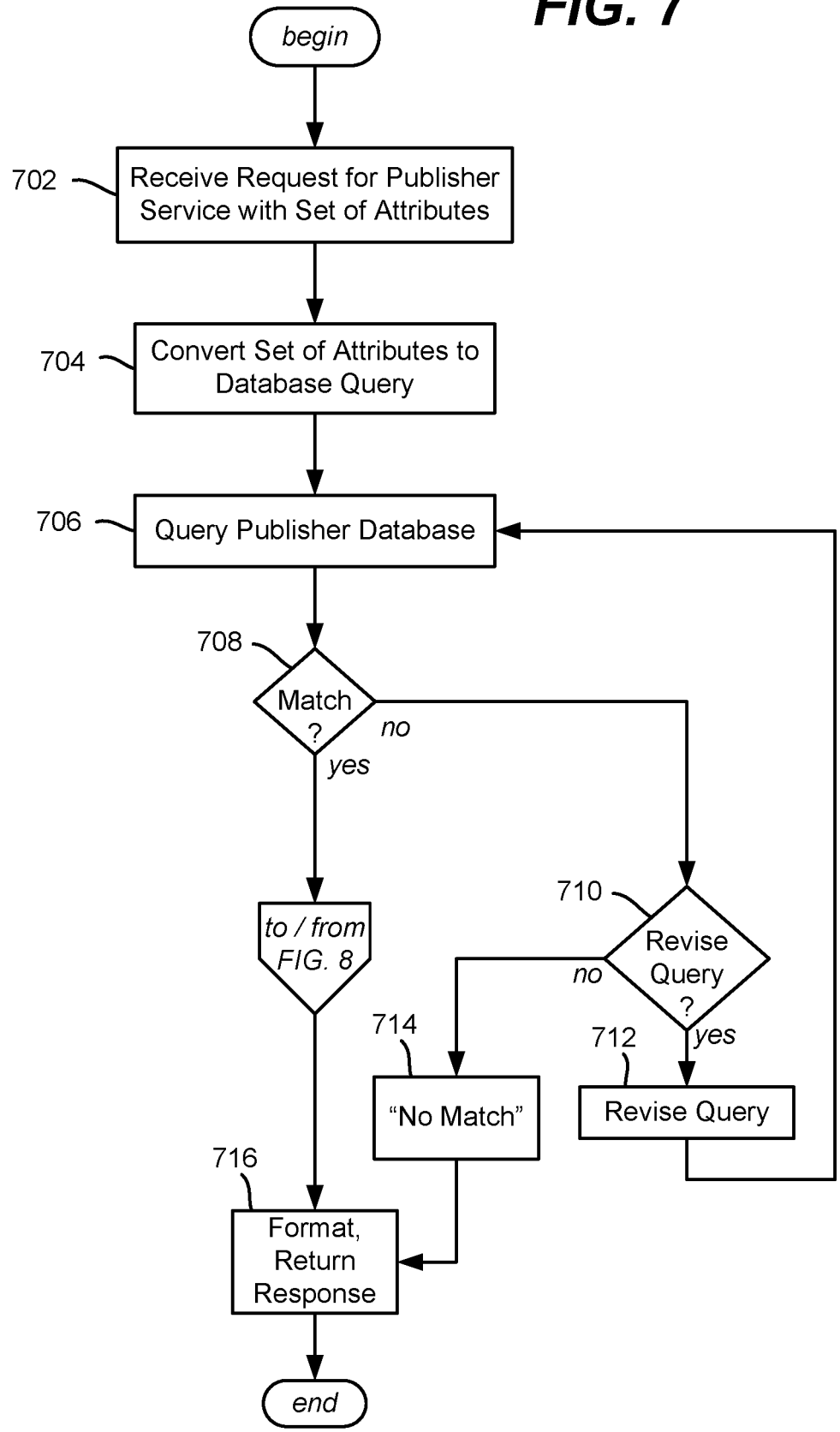
FIGS. 7 and 8 comprise a flow diagram showing example steps that may be taken by matching logic to locate and process matching publisher services into results for returning to a subscriber service, according to one or more example implementations.
Figure 8:
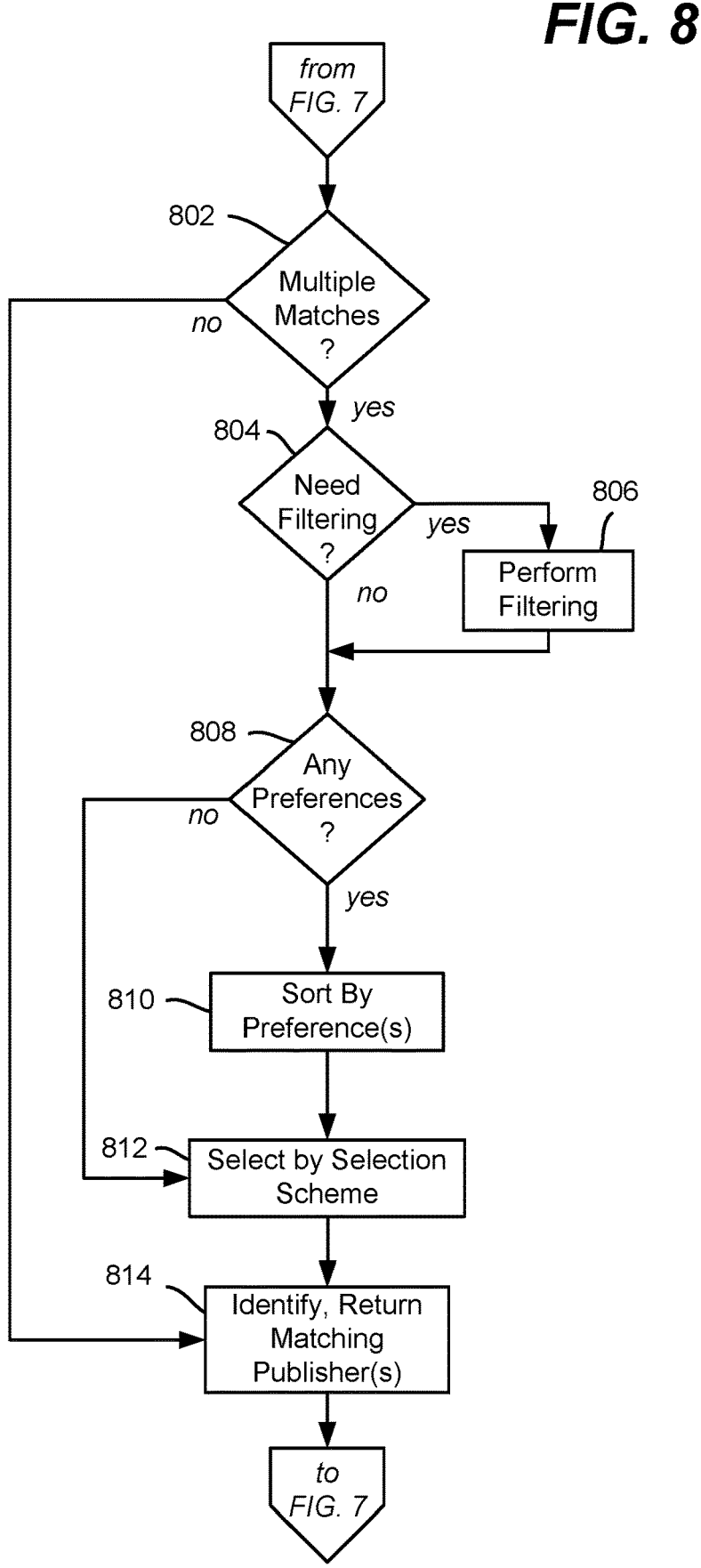

Turning to example operations of a matching process, FIGS. 7 and 8 comprise a flow diagram having steps that may be used to return a matching publisher service or list of matching publisher services. Step 702 represents receiving the request, including the subscriber service-specified attributes, and step 704 represents converting the request into a database query. As set forth above, the matching process logic may recognize that multiple, separate database queries may be used instead of a single query, e.g., if more efficient.

Step 706 represents querying the publisher service database for one or more records having matching attribute(s). If there is no match, step 710 represents making a determination as to whether the query can be revised, e.g., broadened. As exemplified above, a query such as {attr1=A, attr2=PREFER B} may first query for {attr1=A, attr2=B} and, and if nothing matches, broaden to another query that is for {attr1=A}. If the query can be revised, step 712 revises the query and returns to step 706 to make the revised query. If the query cannot be revised, or cannot be revised further (e.g., the broadened query {attr1=A} still returned no matches), the result is "no match" or the like, which is returned in a formatted response at step 716.

If instead at step 708 there was at least one match, the process continues to step 802 of FIG. 8, which evaluates whether there are multiple records that matched. If there is only a single match, the matching record used at step 814 to obtain and return the matching publisher service information, which is returned to the subscriber service in a formatted response (step 716).

If there are multiple matches, then as described above, filtering, sorting and/or selection may be performed by the repository's matching process 516/result processing operations 552 (FIGS. 5 and 6). If some post-filtering is to be performed to narrow the results as generally described above, steps 804 and 806 are performed. Note that filtering leaves at least one matching record, otherwise the filtering results are discarded.

Step 808 represents determining if (after any filtering) some preference-based sorting is needed. If not, sorting is skipped, otherwise step 810 is performed to sort the matching records according to subscriber service preferences, one or more criteria related to the publisher service preferences, and/or the like as described above. Note that as also described above, the number of records that are able to be sorted may be reduced before sorting, such as into a more manageable number for efficiency.

Step 812 represents selecting some or all of the remaining records for returning to the requesting subscriber service as publisher service information (via step 814). For example, if the subscriber service only wants one, then the top one (after any sorting) is returned. If the subscriber service wants up to ten (and this number is within any repository limit), then up to the top ten are returned. If the repository's default is up to five and the subscriber service specifies no number, then up to the top five are returned, and so on. Note that if multiple publisher services are returned, at least some of each one's attribute information may be returned with each of the publisher service's information, so that the subscriber service can make an attribute-based selection.

In this way, a subscriber service requests one or more publisher services that match a subscriber service-specified attribute set. The attributes are arbitrary in terms of what can be specified, as long as the subscriber services, publisher services and the repository agree on the attributes that can be recorded in conjunction with a publisher service, specified by a subscriber service, and matched at the repository. In one or more implementations described herein, the subscriber service can also specify a desired number of publisher services to be returned, and get that number of publisher services back, (if at least that many match and the repository limit, if any, is not exceeded). Note that the subscriber can request and receive all, and prune the results during subscriber-side match processing as described herein.

Thus, in one or more implementations, a subscriber service may receive multiple matching publisher services with respect to a set of attributes specified by the subscriber service. Further, a subscriber service may revise a request if no matches are returned.

Indeed, another way to choose via subscriber service preferences is based upon the technology's ability to create an abstract endpoint. This may be done by using multiple matching iterations in the subscribing service discovery runtime; (note this is transparent to the publisher service and subscribing services other than the discovery runtime). For example, a subscriber service discovery runtime may request a publisher service that matches attributes {attr1=A, attr2=B and attr3=C}; if no match exists, the subscriber service discovery runtime receives a "no match" message or the like. The subscriber service discovery runtime then may request a publisher service that matches attributes {attr1=A, attr2=B and attr3=D}, and so on, until a match is found. Thus, the subscriber service may request attribute preferences among publisher services via multiple iterations and/or retries as needed, which is useful in general, and may be needed in an implementation in which a repository matching process does not support specifying preferences.

Further, the subscriber service discovery runtime, upon a "no match" result, also may broaden the request by specifying less attributes (instead of or in addition to different ones). For example, if the request for a publisher service that matches {attr1=A, attr2=B and attr3=D} fails to return a match, the subscriber service may subsequently request attributes {attr1=A, attr2=B} and perform subscriber service-based filtering, sorting and/or selection on the results. Again, this is another technique to prefer one publisher service over another.

Figure 9:
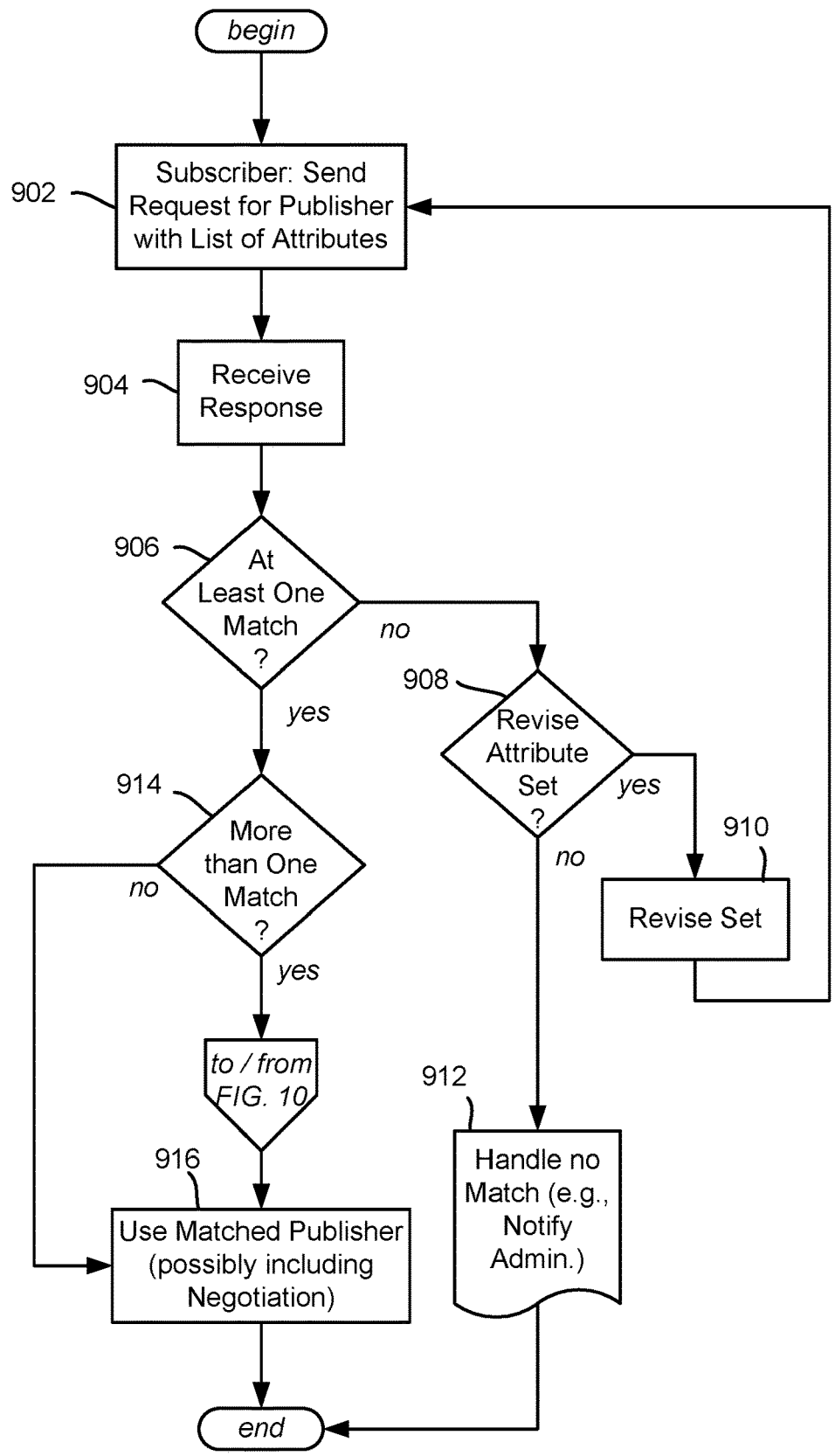
FIGS. 9 and 10 comprise a flow diagram showing example steps that may be taken by a subscriber service discovery runtime to specify a set of attributes for matching to publisher services, and to receive and use matching results, according to one or more example implementations.
Figure 10:
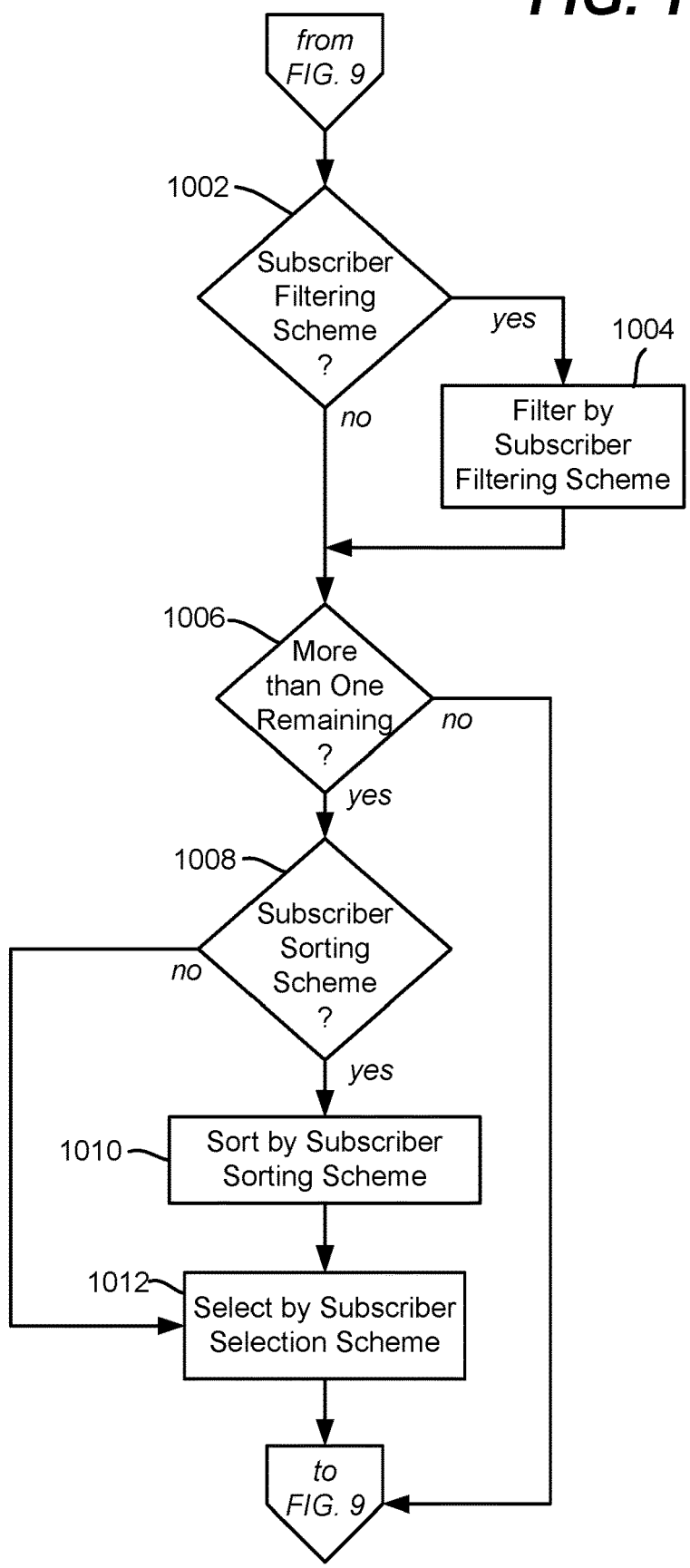

FIGS. 9 and 10 comprise a flow diagram representing example operations of the subscriber service discovery runtime, beginning at step 902 where a subscriber service discovery runtime requests a matching publisher service list along with a set of attributes to those publisher services need to match. It is understood that any other information that a subscriber service wants to convey, such as a desired number of matches to return, may accompany the request data.

Step 904 represents receiving a response at the subscriber service discovery runtime from the repository discovery runtime. If there is not at least one matching publisher service identified (step 906), then step 908 evaluates whether the attribute set may be revised. For example, instead of specifying a preference for one attribute (e.g., because the repository runtime does not support preferences), the subscriber service discovery runtime may be designed to first instead try one attribute set, then try another iteration with a different attribute set, and so on as described above. Further, the subscriber service discovery runtime may be designed to broaden a request if no matches are returned, e.g., by dropping one or more attributes, deemed by the subscriber service as less important, from the attribute set. If at step 908 the specified attribute set may be revised, then step 910 revises the attribute set and returns to step 902 to request matching publisher service(s) with the revised set. Otherwise step 912 is performed to handle the "no match" situation, e.g., to notify an administrator or the like that he subscriber service is unable to find a matching publisher service and thus action is needed if the subscriber service is to function. A typical way to handle the no match or Match Not Found condition is to return with an error message and log, at an appropriate level of verbosity, that there was no match.

If instead there is at least one matching publisher service identified at step 906, step 914 evaluates whether there is only one, or more than one. If only one, then step 916 is performed whereby the subscriber service begins to use the publisher service. Note that this may include some post-discovery negotiation built into the subscriber service and publisher service. For example, consider that the subscriber service (as previously determined) works close to optimally when the publisher service has a health check period of 0.8 seconds. If the matched publisher service has a range of 0.5 to 1.0, the subscriber service may negotiate with the publisher service to use a 0.8 second health check period. Similarly, other multiple capabilities may be matched and negotiated to use one that works best for one or both entities. For example, a subscriber service can operate with random load balancing or round-robin load balancing, and thus requests either, but works better with round-robin load balancing, which thus can be negotiated if the matched publisher service can also do either.

Returning to step 914, if there are multiple matching publisher services, logic such as exemplified in the steps of FIG. 10 may be used by the subscriber service to determine which one to use. Filtering, sorting and/or selection may be performed by the subscriber service after the repository's discovery operations has returned multiple matching publisher services.

Step 1002 represents evaluating whether the subscriber service is designed with any filtering scheme; if so, step 1004 filters out any publisher service according to the scheme. For example, the subscriber service may maintain a blacklist of publisher services that tend to fail, and filter out those blacklisted (as long as at least one remains after filtering).

Step 1006 represents determining if filtering has left only one publisher service, in which event any sorting or selection operations are meaningless, and thus bypasses such operations by returning to FIG. 9, step 916. If more than one, steps 1008 and 1010 perform sorting if a subscriber service-sorting scheme exists, and step 1012 selects one after any sorting. An example subscriber service sorting scheme may be one that ranks a publisher service higher when that publisher service is known to allow negotiation of a certain attribute value versus a publisher service that does not, for example.

In this way, when more than one publisher service matches the set of subscriber service-listed attributes, a subscriber service is not limited to what the repository selects as a matching publisher service. This allows for subscriber services to perform trial and error with the attribute set, until a preference is met, filter out and/or sort matching publisher services based upon subscriber service-determined criteria, rank and so on. Moreover, and additional advantage to client-side match processing may be that a client (subscriber service) may aggregate the results from multiple disparate repositories.

As can be seen, described herein is a flexible and extensible technology that allows a subscriber service to specify any set of arbitrary attributes, which are then matched against publisher services' registered attributes. The technology allows for concepts such as matching by Boolean operators, matching by preferences, matching that includes filtering, sorting and/or selection, post-matching (subscriber service) filtering, sorting and/or selection, as well as post-matching negotiation.

One or more aspects are directed towards receiving a request for matching publisher service data as part of discovery operations of a subscriber service, in which the request is associated with a set of arbitrary attributes to match against the publisher service data. Aspects include matching the set of arbitrary attributes to one or more publisher services that have each registered one or more attributes as a registered attribute set in a repository. If at least one publisher service is a matched publisher service, a set identifying at least one matched publisher service is returned in response to the request.

Also described is the ability to receive a registration request from a publisher service, with the request comprising publisher service data that includes attribute data, and registering the publisher service in association with the attribute data. Registering the publisher service in association with the attribute data may include generating a database record that represents the publisher service and the attribute data, and writing the database record to a database. Matching the set of arbitrary attributes to the publisher services may include formulating a database query from at least part of the set of arbitrary attributes, and querying the database with the database query. Querying the database with the database query may result in receiving no matching publisher services, in which event the database query may be revised into another query for querying the database with the other query.

Matching the set of arbitrary attributes to one or more publisher services that have registered attributes in a repository may result in matching a plurality of publisher services; if so, other aspects may include filtering the plurality of publisher services, sorting the plurality of publisher services and/or selecting from among the plurality of publisher services. A subscriber service may potentially load balance across all or a subset of qualifying publishers, at least one of which may be obtained from one or more different repositories.

A plurality of identifiers corresponding to the plurality of matched publisher services may be returned, each matched publisher service identifier having associated data representing one or more values for at least one of the one or more specified attributes. If a plurality is returned, described is receiving the plurality of identifiers at the subscriber service, and at the subscriber service, based upon the associated data, the subscriber service may filter the plurality of publisher services, sort the plurality of publisher services and/or select from among the plurality of publisher services.

Also described herein is communicating between the subscriber service and a matched publisher service. The communication may include the subscriber service negotiating a value of at least one attribute with the publisher service.

When no publisher service is a matched publisher service, described herein is returning an indication to the subscriber service that no publisher service was matched, and receiving the indication at the subscriber service. In response, the subscriber service may revise the set of arbitrary attributes into a revised set of attributes, and send the revised set in a request to match the revised set of attributes against the registered attribute sets of the publisher services.

One or more aspects are directed towards a repository coupled to subscriber service discovery runtimes, and a data store that maintains information of the repository. Aspects include registration logic coupled to the repository that registers publisher services in the data store, each publisher service registered with an identity and a set of one or more registered attributes supported by that publisher service. Matching logic coupled to the data store is configured to receive a set of attributes specified by a subscriber service discovery runtime, and to access the data store to attempt to locate at least one publisher service having a set of registered attributes that match the set of attributes specified by the subscriber service discovery runtime.

The data store may be a database, the registration logic may comprise a record writing process, and the matching logic may comprise a query formulator.

The registered attributes of a publisher service may comprise at least one of the following types: uniform resource identifier override data, API version data, at least one load balancing policy, one or more customized health checking attributes, a rate or period of health checking, API call rate control data, at least one retry policy, and/or at least one type of marshalling.

The matching logic may locate a plurality of publisher services having registered attributes that match the set of attributes specified by the subscriber service discovery runtime. If so, the matching logic may filter the plurality of publisher services, sort the plurality of publisher services and/or select from among the plurality of publisher services.

The matching logic may locate and return to the subscriber service discovery runtime a plurality of publisher services having registered attributes that match the set of attributes specified by the subscriber service discovery runtime.

One or more aspects are directed towards receiving a subscriber service discovery request, in which the request is associated with a set of arbitrary attributes specified by a subscriber service. Described herein is matching information in the set of arbitrary attributes specified by the subscriber service against registered publisher service data to select one or more matching publisher services, in which the publisher service data corresponds to arbitrary attributes registered in association with each publisher of a plurality of publisher services, and returning a result set identifying at least one matching publisher service in response to the request.

The registered publisher service data may be maintained in a database, and wherein matching the information in the set of arbitrary attributes specified by the subscriber service may comprise formulating a database query corresponding to the set of arbitrary attributes specified by the subscriber service, and querying the database with the query.

Matching the information in the set of arbitrary attributes against the registered publisher service data may comprise matching data corresponding to at least one of the following attribute types, including: uniform resource identifier override data, API version data, at least one load balancing policy, one or more customized health checking attributes, a rate or period of health checking, API call rate control data, at least one retry policy, and/or at least one type of marshalling.

The subscriber service discovery request may be received at a repository, and at the repository and/or at the subscriber service, aspects may include filtering a plurality of matching publisher services, sorting a plurality of matching publisher services and/or selecting from among a plurality of matching publisher services.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
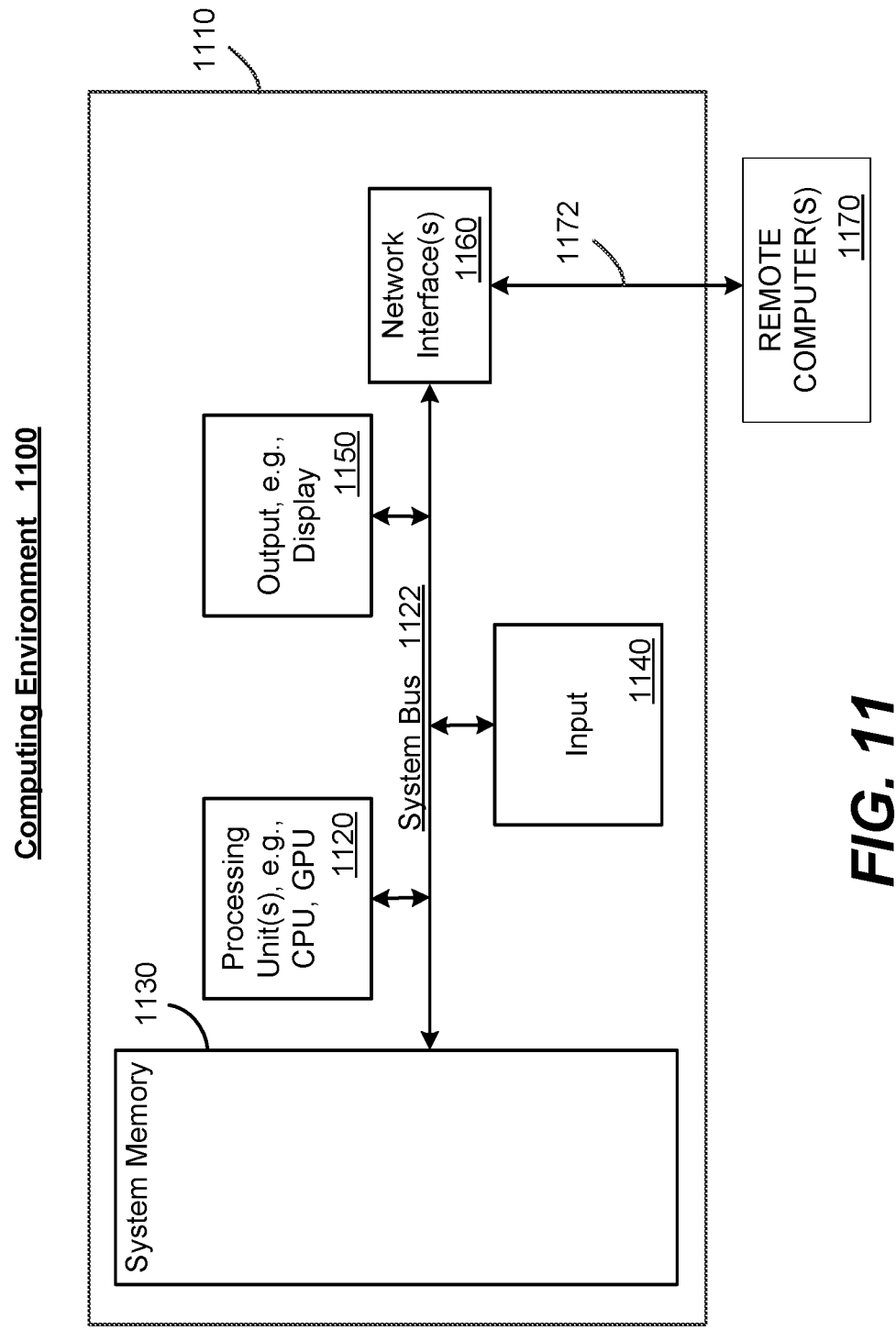
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
receiving, by a repository comprising a processor, respective registration requests from a plurality of publisher services, the respective registration requests comprising respective arbitrary publisher attributes of the plurality of publisher services;
converting, by the repository using a set of rules, the respective arbitrary publisher attributes into respective publisher records for the plurality of publisher services in a data structure;
receiving, by the repository from a subscriber service, a request comprising a set of arbitrary attributes to match against the publisher records;
converting, by the repository using the set of rules, the set of arbitrary attributes of the request into a query formatted in accordance with the data structure for the publisher records for the plurality of publisher services and at least one matching criterion of the request;
determining, by the repository using the query, whether one or more publisher services with publisher records that have one or more arbitrary publisher attributes matches the query;
in response to determining that at least two publisher services match the query, filtering the at least two publisher services that match the query based on how often a publisher service fails, and returning a filtered set identifying the at least two publisher services in response to the request; and
selecting two or more publisher services of the at least two publisher services to meet a load balancing objective of the at least one matching criterion, wherein the load balancing objective is specified as an attribute in the query, and returning a set identifying the two or more publisher services in response to the request.

2. The method of claim 1, wherein a publisher service of the at least two publisher services is part of a chained service-to-service configuration, wherein the chained service-to-service configuration includes at least one publisher service that is a subscriber to another publisher service.

3. The method of claim 1, wherein the determining whether one or more publisher services with publisher records that have one or more arbitrary publisher attributes matches the query comprises querying the data structure with the query.

4. The method of claim 1, further comprising in response to the determining that no publisher services matches the query, revising, by the repository, the query into another query based on the at least one matching criterion of the request and querying, by the repository, the data structure with the other query.

5. The method of claim 1, wherein the filtering the at least two publisher services that match the query is further based on how many subscriber services are matched to a publisher service or a publisher service response time.

6. The method of claim 1, wherein the returning the filtered set identifying the at least two publisher services in response to the request comprises returning respective identifiers corresponding to the at least two publisher services, each identifier having associated data representing one or more values for at least one of the one or more arbitrary publisher attributes from a publisher record associated with the corresponding publisher service.

7. The method of claim 6, further comprising, at the subscriber service, receiving the respective identifiers, and at the subscriber service, based upon the associated data, filtering the at least two publisher services, sorting the at least two publisher services, or selecting from among the at least two publisher services.

8. The method of claim 1, wherein the query comprises a plurality of ordered subqueries based on the at least one matching criterion of the request.

9. The method of claim 1, further comprising, communicating between the subscriber service and a publisher service of the at least two publisher services, including negotiating a value of at least one attribute with the publisher service.

10. The method of claim 1, wherein the returning the filtered set identifying the at least two publisher services in response to the request comprises returning respective communication information for the at least two publisher services needed for the subscriber service to initiate respective communication links with the at least two publisher services.

11. A system comprising:
a processor; and
a memory communicatively coupled to the processor, the memory having stored therein computer-executable components, comprising:
a repository component configured to:
receive respective registration requests from a plurality of publisher services, the respective registration requests comprising respective arbitrary publisher attributes of the plurality of publisher services;
convert, using a set of rules, the respective arbitrary publisher attributes into respective publisher records for the plurality of publisher services in a data structure;
receive, from a subscriber service, a request comprising a set of arbitrary attributes to match against the publisher records;
convert, using the set of rules, the set of arbitrary attributes of the request into a query formatted in accordance with the data structure for the publisher records for the plurality of publisher services and at least one matching criterion of the request;
determine, using the query, whether one or more publisher services with publisher records that have one or more arbitrary publisher attributes matches the query; and
in response to a determination that at least two publisher services match the query, randomly narrow the at least two publisher services that match the query into a narrowed set, filter or sort the narrowed set based on how many subscriber services are matched to a publisher service, and return a filtered or sorted set identifying at least one of the at least two publisher services in response to the request.

12. The system of claim 11, wherein the repository component is further configured to
select two or more publisher services of the at least two publisher services to meet a load balancing objective of the at least one matching criterion, wherein the load balancing objective is specified as an attribute in the query, and return a set identifying the two or more publisher services in response to the request.

13. The system of claim 11, wherein a publisher service of the at least two publisher services is part of a chained service-to-service configuration, wherein the chained service-to-service configuration includes at least one publisher service that is a subscriber to another publisher service.

14. The system of claim 11, wherein the repository component is further configured to:
in response to a determination that no publisher services match the query, revise the query into another query based on the at least one matching criterion of the request and search the data structure with the other query.

15. The system of claim 11, wherein the query comprises a plurality of ordered subqueries based on the at least one matching criterion of the request.

16. The system of claim 11, wherein the filter the at least two publisher services that match the query is further based on how often a publisher service fails or a publisher service response time.

17. A non-transitory computer-readable medium having instructions stored thereon that, in response to execution, cause a system including a processor to perform operations comprising:
receiving respective registration requests from a plurality of publisher services, the respective registration requests comprising respective arbitrary publisher attributes of the plurality of publisher services;
converting, using a set of rules, the respective arbitrary publisher attributes into respective publisher records for the plurality of publisher services in a data structure;
receiving, from a subscriber service, a request comprising with a set of arbitrary attributes to match against the publisher records;
converting, using the set of rules, the set of arbitrary attributes of the request into a query formatted in accordance with the data structure for the publisher records for the plurality of publisher services and at least one matching criterion of the request;
determining, using the query, whether one or more matching publisher services with publisher records that have one or more arbitrary publisher attributes matches the query;
in response to determining that at least two publisher services match the query, filtering the at least two publisher services that match the query based on a publisher service response time, and returning a filtered result set identifying the at least two publisher services in response to the request; and
selecting two or more publisher services of the at least two publisher services to meet a load balancing objective of the at least one matching criterion, wherein the load balancing objective is specified as an attribute in the query, and returning a set identifying the two or more publisher services in response to the request.

18. The one or more machine-readable storage media of claim 17, wherein a publisher service of the at least two publisher services is part of a chained service-to-service configuration, wherein the chained service-to-service configuration includes at least one publisher service that is a subscriber to another publisher service.

19. The one or more machine-readable storage media of claim 17, the operations further comprising in response to the determining that no publisher services matches the query, revising, by the repository, the query into another query based on the at least one matching criterion of the request and querying, by the repository, the data structure with the other query.

20. The non-transitory computer-readable medium of claim 17, wherein the filtering the at least two publisher services that match the query is further based on how often a publisher service fails or how many subscriber services are matched to a publisher service.

* * * * *